United States Patent [19]

Schwaiger et al.

[11] Patent Number: 4,743,769
[45] Date of Patent: May 10, 1988

[54] NON-CONTACTING MEASURING APPARATUS FOR MEASURING A DISPLACEMENT IN DEPENDENCE ON THE INCIDENCE OF A LASER BEAM ON A LASER BEAM DETECTOR

[75] Inventors: Max Schwaiger, Ostermiething; Heinz Rieder, St. Pantaleon, both of Austria

[73] Assignee: RSF-Electronik Gesellschaft m.b.H., Tarsdorf, Austria

[21] Appl. No.: 903,464

[22] Filed: Sep. 3, 1986

[30] Foreign Application Priority Data

Sep. 11, 1985 [AT] Austria ................. 2654/85

[51] Int. Cl.$^4$ ............................................. G01B 11/00
[52] U.S. Cl. ..................................... 250/560; 356/387
[58] Field of Search ................ 250/560, 561; 356/384, 356/387, 386

[56] References Cited

U.S. PATENT DOCUMENTS

| | | | |
|---|---|---|---|
| 2,812,685 | 11/1957 | Vossberg | 250/560 X |
| 3,853,406 | 12/1974 | Zanoni | |
| 3,870,890 | 3/1975 | Binks et al. | 250/560 |
| 3,905,705 | 9/1975 | Petrohilos | |
| 3,922,094 | 11/1975 | Colding et al. | 250/560 X |
| 4,068,955 | 1/1978 | Bodlaj | 250/560 X |
| 4,192,612 | 3/1980 | Bodlaj | 250/560 X |
| 4,381,152 | 4/1983 | Riech et al. | 250/560 X |
| 4,432,648 | 2/1984 | Musto et al. | 250/560 X |
| 4,465,937 | 8/1984 | Forbes | 250/560 |

FOREIGN PATENT DOCUMENTS 2849252 5/1980 Fed. Rep. of Germany.

Primary Examiner—Thomas H. Tarcza
Assistant Examiner—Mark Hellner
Attorney, Agent, or Firm—Kurt Kelman

[57] ABSTRACT

A non-contacting measuring apparatus for measuring a displacement in dependence on the incidence of a laser beam on a laser beam detector, e.g., for determining dimensions, the position or the spacing of objects, comprises a scanning unit for moving a laser beam, which has been emitted by a laser and projected across a measuring area from one edge thereof, and a receiver, which is disposed on the other side of the measuring area and arranged to receive said laser beam. Said receiver comprises a detector for generating an output signal in response to the incidence and nonincidence of said laser beam on said detector. A measuring circuit is responsive to said output signal. To provide such a measuring apparatus which is structurally simple and has a wide field of application and can be designed to have a large measuring area, a beam-transmitting element of the scanning unit and an associated beam-receiving element of the receiver, which includes also the detector, are movable parallel to each other and in synchronism with each other in a direction which is normal to the direction in which the laser beam is projected across the measuring area. At least one of the transmitting and receiving elements is coupled to a length-measuring system, which includes an indicating or evaluating circuit that is controlled by the detector and constitutes a part of the measuring circuit.

10 Claims, 3 Drawing Sheets

NON-CONTACTING MEASURING APPARATUS FOR MEASURING A DISPLACEMENT IN DEPENDENCE ON THE INCIDENCE OF A LASER BEAM ON A LASER BEAM DETECTOR

BACKGROUND OF THE INVENTION

1. Field of the Invention

This invention relates to measuring apparatus for a non-contacting measurement of dimensions and/or positions of objects and/or clearances between objects, particularly workpieces, in dependence on the incidence of a laser beam on a laser beam detector, comprising a scanner for moving a laser beam emitted by a laser and projected from one edge of a measuring area across said area in a plane which is defined by said laser beam and the direction of the movement imparted to the laser beam by the scanner, and a receiver for receiving the laser beam which has been projected across the measuring area, which receiver comprises a detector, which is responsive to the incidence and non-incidence of said laser beam and controls a measuring circuit.

2. Description of the Prior Art

Measuring apparatus of that kind can be used to measure the absolute dimensions of objects which are scanned with the laser beam, also for a measurement of tolerances, for checking the roundness of rotating workpieces, for a determination of configurations and for a measurement of wear. Such measuring systems have also been used to detect the position of objects and the clearances between at least two objects.

In all known measuring apparatus of the kind discussed here, the means for moving the laser beam that has been emitted by the laser are basically identical or similar and comprise reflectors, which are disposed in the optical path of the laser beam and to which a pivotal or rotational movement is imparted by mechanical means. Such reflectors may consist of oscillating mirrors or oscillating reflecting prisms or of polyhedral prisms which have totally reflecting outside surfaces and to which a rotation is imparted so that they deflect the laser beam through a varying angle. The laser beam to which a pivotal movement is thus imparted is incident on a focussing optical system having a focus on the moving surface of the reflector so that the laser beam leaving that optical system is parallel to the optical axis of that optical system. A corresponding focussing optical system is associated with the receiver and a photodetector is disposed at the focus of the latter optical system. The time for which the moving laser beam casts a shadow of an object being scanned, so that the laser beam is not incident on the detector, is determined and is utilized for a calculation, e.g., of the diameter of said object.

The known apparatus are highly expensive because the diameter of each of the focussing optical systems must be at least as large as the width of the range being scanned. As even a strongly confined laser beam will have a finite diameter, the reflector or rotating mirror cannot be disposed at the focal point of the focussing optical system throughout the area on which the laser beam is reflected. Where mirrors are used, the thickness of the layer which must be penetrated by the laser beam until it is incident on the reflecting layer will vary with the angular position of the mirror and this will also result in a variation of the results. For this reason the focussing optical system must be corrected in each individual measuring apparatus in adaptation to the reflector which is actually used so that the scanning beam leaving the focussing optical system will be parallel to the axis of the focussing optical system even when the laser beam is scanning the measuring area near its edge. For the reasons stated above, the known measuring apparatus of the kind just described have only a narrow field of application and the determination of the result of measurement by a processing of the signals which have been generated in response to the scanning can be performed only by a computer which involves a substantial logic circuitry. In that processing, the time of non-incidence, the position of the reflector at the time of the transition between incidence and non-incidence, and other parameters, including also the instantaneous angular velocity, must be taken into account. For special purposes, the comptuer may have memories associated with it in which the measured values which correspond to predetermined combinations of parameters are stored so that it will be sufficient to retrieve said measured values for the actual measurement. But the writing of the required information into such memories is a time-consuming work and a given measuring program can be used only to perform predetermined measuring tasks.

SUMMARY OF THE INVENTION

It is an object of the invention to provide a measuring apparatus which is of the kind described first hereinbefore and which is simple in structure and has a wide field of application and can be designed for a relatively large measuring range, if required, but does not involve a considerable increase in expenditure, and which can easily be adapted to different measuring tasks.

This object is accomplished in that the scanner comprises a movable beam-transmitting element and the receiver, which comprises the detector, comprises a movable beam-receiving element, said movable elements are mounted to be movable, preferably in synchronism, along parallel paths, which are normal or approximately normal to the direction in which the laser beam is projected across the measuring area, at least one of said movable elements is coupled to a length-measuring system, and the measuring circuit comprises an indicating or evaluating circuit which is associated with length-measuring system and is controlled by the detector.

Within the scope of the invention it is also possible to provide a mechanism for moving an object to be measured along a path which is normal or approximately normal to the direction in which the laser beam is projected across the measuring area and to couple said mechanism to a length-measuring system, whereas the beam-transmitting element and the beam-receiving element are stationary at least during the measurement.

Owing to the design provided in accordance with the invention, the expensive focussing optical systems of the known scanners can be omitted. The width of the measuring area will depend only on the length of the tracks for the beam-transmitting and beam-receiving movable elements and said element may comprise identical beam deflectors, which may essentially consist only of deflecting prisms or deflecting mirrors and can be used in measuring systems having measuring areas which differ in width. It is known that the width of the measuring area of a given measuring apparatus is limited in practice by the nature of the laser which is employed and the nature of any focussing optical system which is included in the optical path. It will normally be desirable to provide the waist portion of the laser beam within the measuring area. Corrections of higher order will not be required in connection with the deflecting mirrors or deflecting prisms because the positions of said elements relative to the directions of the incident and exiting sections of the layer beam may remain the same throughout the measuring range.

In theory, the laser itself may be moved across the scanning plane. But it will be more desirable in practice in most cases to provide an arrangement in which the laser is stationary and the movable beam-transmitting element of the scanner and preferably also the associated beam-receiving element of the receiver comprise beam deflectors, particularly deflecting mirrors or deflecting prisms. The length-measuring systems may be systems of known type in which a scale, preferably an incremental scale, is optically, electrically, inductively, capacitively or magnetically scanned. In dependence on a selected program, it is possible to measure the length of movement from a reference position to a position in which there is a transition from incidence to non-incidence, or between the positions in which non-incidence is initiated and terminated, or from the position in which there is a transition from non-incidence to incidence, etc.. As a result, it is possible to take from an object which is disposed in the measuring area a direct measurement of a dimension in the direction of movements or of the position of that object within the measuring area and to calculate for circular workpieces the length of the radius and the position of the axis. The length-measuring system may comprise a synchrotransmitter which is coupled to the element which is movable along a line. In some cases it will be useful to provide two length-measuring systems, which are respectively coupled to the beam-transmitting and beam-receiving movable elements because such an arrangement will increase the field of application and the accuracy of the measurement. If two length-measuring systems are used it will be possible to detect any deviation from a synchronous movement of the beam-transmitting and beam-receiving elements and such deviations can either be corrected or correcting data may be derived from such detected deviations in a computer of the measuring system. Obviously an non-synchronous movement will occur only in very small ranges.

In the simplest case the laser beam and the equipment associated with it will constitute an adjustable light barrier, which will control the evaluating circuit of the length-measuring system in dependence on the incidence or a non-incidence of the laser beam on the detector. The degree of darkening at which the control signal is initiated is defined in relation to a reference signal, which is generated by a detector that is disposed. e.g., at the secondary end of the laser.

If the laser system constitutes a light barrier, the laser may consist of a continuously emitting laser or a pulsed laser.

In accordance with a further feature the laser is succeeded by a beam splitter, particularly by a beam-splitting prism, which emits two laser beams, which by means of respective scanners are movable in the scanning plane across the measuring area in two directions, which are transverse and particularly at right angles to each other, and respective receivers are provided for receiving said laser beams. In that case a single laser can be used to scan the object in the scanning plane in two different directions. The scanning in the two directions may be effected at the same time and the position of the scanning beams relative to each other will be exactly defined. Each scanner and the associated receiver may be driven independently of or in common with the other scanner and the receiver associated therewith.

For measurements to be taken at locations which are accessible only with difficulty or in regions in which other parts are present or must be attached, e.g., during the operation of a machine, it is possible to provide a measuring apparatus which comprises two parallel tracks for the movable elements of the scanner and the receiver, which tracks are rigidly interconnected at one end, whereas the measuring apparatus is open at the other end of the parallel tracks so that an object to be measured can be introduced between the parallel tracks from said other end. Such a measuring apparatus can be pivoted to a machine tool or the like on an axis which is normal to the scanning plane and preferably disposed outside the measuring area.

DETAILED DESCRIPTION OF THE PREFERRED EMBODIMENTS

Figure 1:
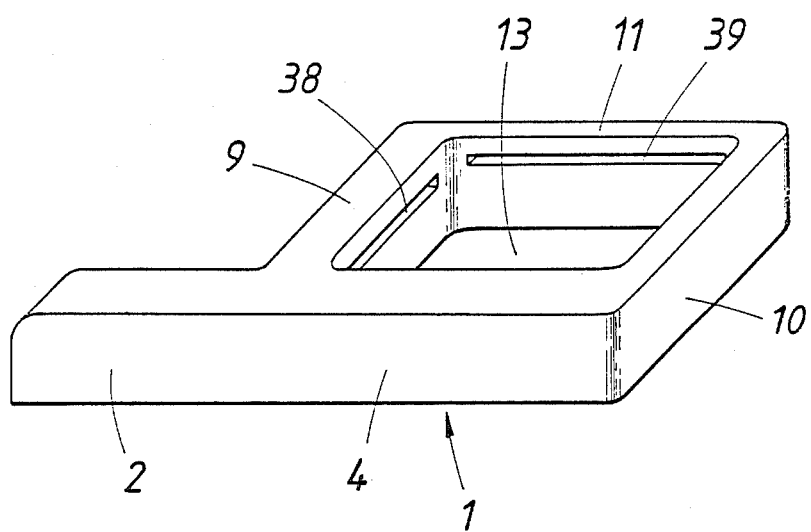
FIG. 1 is a diagrammatic perspective view showing a measuring apparatus embodying the invention.

Further details and advantages of the invention will become apparent from the following detailed description of illustrative embodiments of the invention shown on the drawing.

Figure 2:
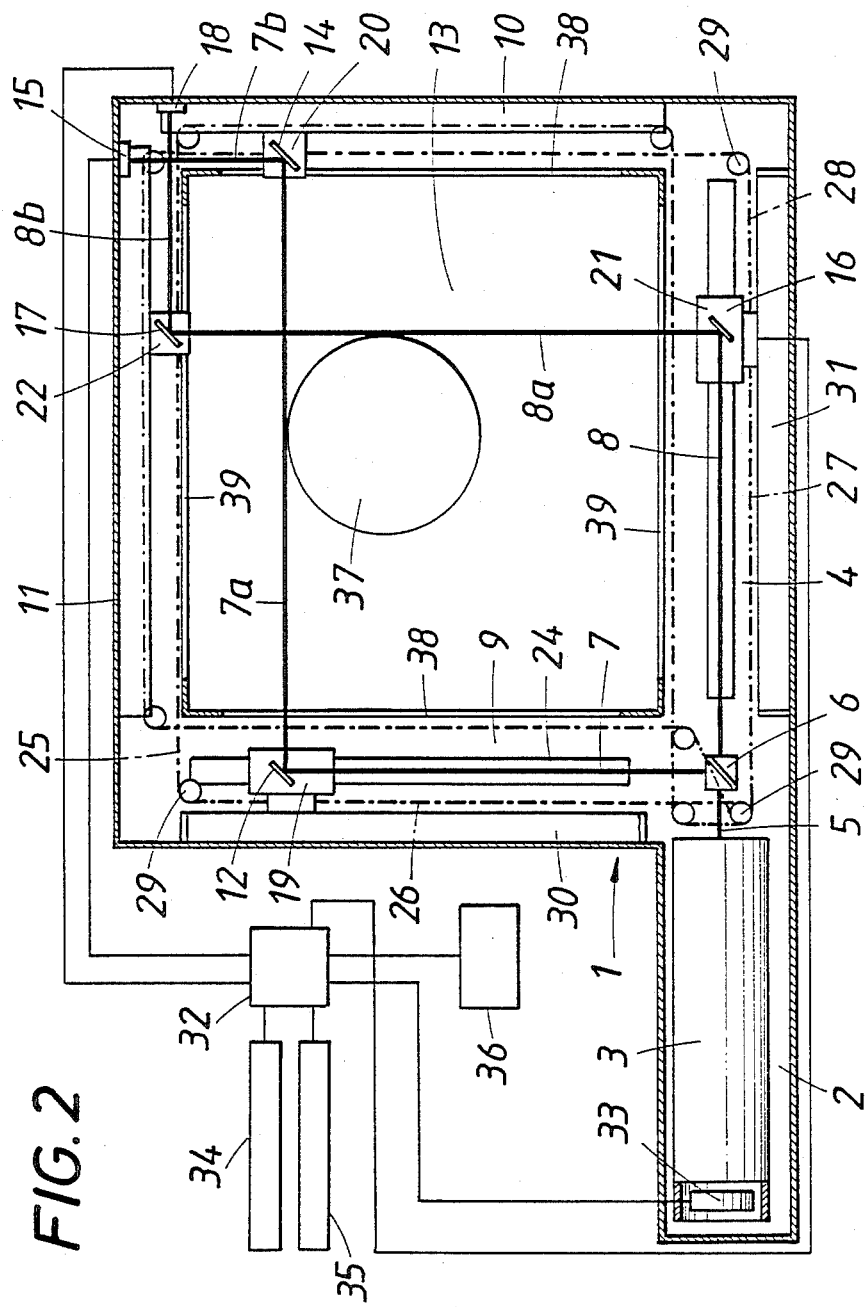
FIG. 2 is an also diagrammatic top plan view showing the apparatus of FIG. 1 but with the housing shown to be open at its top so that the most important elements of the measuring apparatus are visible.
Figure 3:
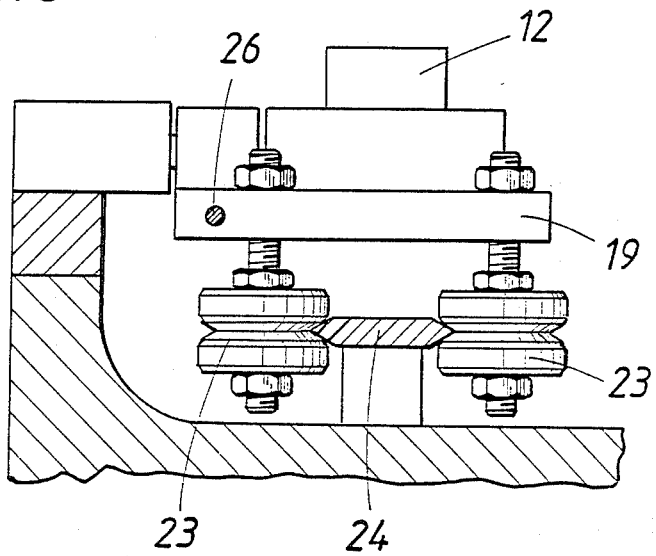
FIG. 3 is a sectional view taken through the bed of the apparatus and showing a parallel track in order to make the design more clearly apparent.

In the embodiment shown in FIGS. 1 to 3 a housing 1 has generally the form of a rectangular or square frame having one tubular extension 2. A laser 3 is accommodated in said extension 2 and emits a laser beam 5 in a direction which is parallel to the tubular lower bar 4 of the frame 1. That laser beam 5 is incident on a beam splitter 6, in which the laser beam is split to form two laser beams 7 and 8. In the present embodiment, the beam 8 proceeds in the direction of the beam 5 and the other beam 7 extends in and parallel to the tubular bar 9 of the frame 1. The frame 1 further comprises a tubular bar 10, which is opposite and parallel to the bar 9, and a tubular bar 11, which is opposite and parallel to the bar 8. The beam 7 is incident on a deflecting prism, which consists, e.g., of a penta prism and has been illustrated as a mirror 12, by which the beam 7 is deflected through 90° and projected as a scanning beam 7a, which is parallel to the bars 4, 11, across a measuring area, which is disposed over a measuring surface 13. The bar 10 contains another deflecting prism 14, by which the beam 7a is deflected through 90° so that the beam 7b is directed to a detector 15. Corresponding deflecting prisms illustrated as mirrors 16, 17, and a detector 18 are provided for the laser beam which consists of the beam sections 8, 8a, 8b.

The reflectors 12 and 14 are secured to respective wheeled carriages 19 and 20. The reflectors 16 and 17 are secured to respective wheeled carriages 21 and 22. Each of said carriages 19 to 22 is provided with rollers 23 (see FIG. 3), which are supported without play on a straight track rail 24. The carriages 19 and 20 are connected by tensile elements 25 and 26 and the carriages 21 and 22 are connected by tensile elements 27 and 28. The tensile elements 25 to 28 consist of steel tapes or wires and are trained each about a plurality of deflecting rollers 29 so that the steel tape 25 extends from that end of the carriage 19 which is at the top in FIG. 2 to that end of the carriage 20 which is at the bottom in FIG. 2, the steel tape 26 extends from the bottom end of the carriage 19 to the top end of the carriage 20, and a similar crossing is provided between the tensile elements 27 and 28 connected to the carriages 21 and 22. In this arrangement the carriages 19 and 20, on the one hand, and 21 and 22, on the other hand, can be moved only synchronously in the same direction. Alternatively, the drive mechanism may comprise coupling means for moving all four carriages at the same time. The reflectors 12, 14, 16, 17 are moved in unison with the carriages 19 to 22 so that the scanning laser beam section 7b or 8a will also be moved across the measuring area 13.

Each of the carriages 19 and 21 is connected to a movable element of a length-measuring system 30 or 31. Each length-measuring system may consist of an incremental scale and a scanning unit which is movable along said scale. In case of an optoelectronic scanning operation, said scanning unit scans the incremental scale through a grating so that light transmitted through the grating and the scale will be modulated in dependence on the movement of the grating relative to the scale. Said modulated light is incident on photoelectric detectors, which derive electric signals from said light and deliver them to an evaluating circuit 32. The evaluating circuit 32 receives also the output signals of the detectors 15 and 18 and in case of need may receive a reference signal from a detector 33, which is provided at the secondary end of the laser 3. The instantaneous measurement taken can be indicated by indicators 34, 35. Programs for the control of the evaluating circuit 32 may be selected by means of a keyboard 36. In dependence on the selected program, the indicators 34, 35 may indicate the distances from an object 37 placed on the measuring surface 13 to the edges of the measuring surface 13 and/or the dimensions of the object 37 in the two directions in which it is scanned. The inner walls of the tubular bars 8, 9, 10, 11, are formed with slots 38, 39, which constitute passages for the beams 7a, 8a.

In the embodiment shown in FIGS. 1 to 3, the length-measuring systems 30, 31 extend along the bars 4 and 9, respectively. Said length-measuring systems may be replaced by systems comprising two synchro transmitters, which may be driven, e.g., by the tapes 26 and 27. If the length-measuring systems are coupled without a backlash and the end positions of the carriages of said systems are clearly defined, a single synchro transmitter for both systems will be sufficient.

Figure 4:
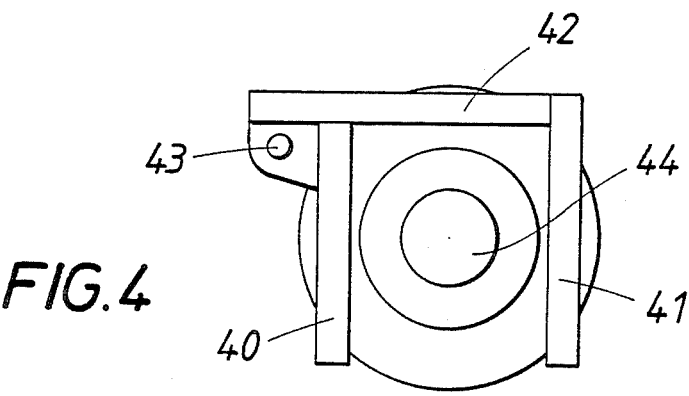
FIG. 4 is a diagrammatic elevation a second embodiment of a measuring apparatus mounted on a lathe.

In the embodiment shown in FIG. 4 a measuring apparatus comprises two tubular bars 40, 41, which correspond to the bars 9, 10 and in which the prisms 12, 14 are guided and the length-measuring system is accommodated. Said two bars 40, 41 are connected only by one crossbar 42. Such a measuring apparatus may be pivoted to a lathe on an axis 43, which is parallel to the axis of the machine and normal to the scanning plane and disposed outside the measuring area so that the apparatus can be used to measure a circular workpiece 44.

Similar apparatus may be used to subject cylindrical workpieces moved through the measuring area to tolerance-checking measurements.

If the length-measuring systems are provided with optoelectronic scanning means, the required illumination may be effected by means of light quantities which have been deflected out of the laser beam.

We claim:

1. A non-contacting measuring apparatus comprising
    (a) a frame bounding a measuring area and including one leg extending in a first direction and two legs extending in a second direction perpendicularly to the first direction, the one leg rigidly connecting the two legs,
    (b) first and second tracks extending in the two legs in the second direction on opposite sides of the measuring area,
    (c) a laser beam transmitter having a beam transmitting element for projecting a laser beam in a predetermined scanning plane across the measuring area in the first direction,
        (1) the beam transmitting element being guided along the first track in the second direction,
    (d) a laser beam receiver having a beam receiving element adapted to receive the laser beam projected in the scanning plane in the first direction by the beam transmitting element,
        (1) the beam receiving element being guided along the second track in the second direction, and the laser beam receiver including
        (2) a detector adapted to receive the projected laser beam and to generate an electric signal indicating the incidence and non-incidence of the projected laser beam on the detector,
    (e) a scanning mechanism operable to cause the projected laser beam to scan an object intersected by the scanning plane in the measuring area and comprising means for moving the beam transmitting and receiving elements in the second direction along the tracks relative to the object, and
    (f) a length-measuring system coupled to at least one of the elements for measuring the extent of the relative movement in the second direction, the length-measuring system including
        (1) measuring circuitry controlling the electric signal.

2. The measuring apparatus set forth in claim 1, wherein said frame is pivoted on an axis which is normal to said scanning plane.

3. The measuring apparatus set forth in claim 2, wherein said axis is disposed outside said measuring area.

4. The measuring apparatus set forth in claim 2, wherein said frame is pivoted on said axis to a machine tool.

5. The measuring apparatus of claim 1, wherein the legs of the frame define a U-shape, and the two legs define a gap opposite the one leg for introducing the object into the measuring area.

6. The measuring apparatus set forth in claim 5, wherein
    said transmitter comprises a laser for emitting a laser beam and a beam splitter for receiving said laser beam from said laser and for projecting first and second laser beams onto said first and second transmitting elements, respectively,
    said first and second transmitting elements comprise first and second beam deflectors for receiving said first and second laser beams, respectively, and for deflecting said first and second laser beams into said first and second directions, respectively.

7. The measuring apparatus set forth in claim 5, wherein
said scanning mechanism comprises means for moving said first transmitting element and said first receiving element in said second direction and for moving said second transmitting element and said second receiving element in said first direction and said second length-measuring system is coupled to one of said second transmitting element and said second receiving element.

8. The measuring apparatus set forth in claim 7, wherein
a length-measuring system for measuring the extent of said relative movement in said first direction is coupled to each of said second transmitting element and said second receiving element.

9. The measuring apparatus set forth in claim 7, wherein
said scanning mechanism comprises means for moving said first transmitting element and said first receiving element in said second direction and for moving at the same time said second transmitting element and said second receiving element in said first direction.

10. A non-contacting measuring apparatus comprising
(a) bounding means defining a measuring area and extending in first and second directions perpendicularly to each other,
(b) a laser beam transmitter having
 (1) a first beam transmitting element for projecting a laser beam in a predetermined scanning plane across the measuring area in the first direction, and
 (2) a second beam transmitting element for projecting a laser beam the scanning plane across the measuring area in the second direction,
(c) a laser beam receiver having
 (1) a first beam receiving element adapted to receive the laser beam projected in the scanning plane in the first direction by the beam first transmitting element,
 (2) a second beam receiving element adapted to receive the laser beam projected in the scanning plane in the second direction by the second beam transmitting element, and the laser beam receiver including
 (3) first and second detectors respectively adapted to receive the projected laser beams and to generate respective electric signals indicating the incidence and non-incidence of the projected laser beams on the respective detectors,
(d) a scanning mechanism operable to cause the projected laser beams to scan an object intersected by the scanning plane in the measuring area and comprising means for moving the beam transmitting and receiving elements in the first and second directions relative to the object, and
(e) a first and second length-measuring system coupled to a respective one of the elements for measuring the extent of the relative movements in the first and second directions, the length-measuring systems including
 (1) measuring circuitry controlling the electric signals.

* * * * *